United States Patent [19]

Buma et al.

[11] Patent Number: 4,735,401
[45] Date of Patent: Apr. 5, 1988

[54] SWITCHING VALVE DEVICE IN AN AIR SUSPENSION

[75] Inventors: Shuuichi Buma, Toyota; Osamu Horiyama, Kani, both of Japan

[73] Assignees: Kayaba Kogyo Kabushiki Kaisha; Toyota Jidosha Kabushiki Kaisha, both of Japan

[21] Appl. No.: 861,225

[22] Filed: May 8, 1986

[30] Foreign Application Priority Data

May 10, 1985 [JP] Japan ............................. 60-68963[U]
May 10, 1985 [JP] Japan ............................. 60-68964[U]

[51] Int. Cl.$^4$ ...................... B60G 11/26; B60G 11/62; B60G 15/10; F16K 47/08
[52] U.S. Cl. .................... 267/64.11; 267/35; 267/64.21; 267/220; 251/118; 137/625.41; 280/714
[58] Field of Search .......................... 267/64.22, 64.11; 188/319; 137/625.41; 251/118, 129.14; 280/711, 707, 714; 138/40, 41, 42, 44; 188/322.13, 322.14, 322.15

[56] References Cited

U.S. PATENT DOCUMENTS

| | | | |
|---|---|---|---|
| 974,790 | 11/1910 | Heuser | 137/625.41 |
| 2,132,011 | 10/1938 | Bennett et al. | 138/40 |
| 4,616,811 | 10/1986 | Buma | 280/714 X |

FOREIGN PATENT DOCUMENTS

| | | | |
|---|---|---|---|
| 0990615 | 6/1976 | Canada | 251/118 |
| 0813094 | 9/1951 | Fed. Rep. of Germany | 138/40 |
| 0706197 | 3/1954 | United Kingdom | 138/40 |
| 1421899 | 1/1976 | United Kingdom | 137/625.41 |

*Primary Examiner*—Andres Kashnikow
*Assistant Examiner*—Richard Potosnak
*Attorney, Agent, or Firm*—McGlew and Tuttle

[57] ABSTRACT

A switching valve device in an air suspension system for such vehicles as automobiles, wherein a plurality of primary air chambers are provided above a shock absorber, which are connected or disconnected with each other to adjust the air spring constant for such vehicles as automobiles rotary valve is provided in the course of the path connecting the respective primary air chambers, and a decompression intercommunicating cushioning air chamber is formed between the rotary valve and a flow restriction stopper holding the rotary valve in place, such that the communication of the cushioning air chamber with one primary air chamber is opened and closed or controlled through the rotary valve, on the one hand, and such that its communication with another primary air chamber is through the flow restriction stopper, on the other hand, whereby a swish sound is prevented by the decompressing action of the cushioning air chamber.

6 Claims, 4 Drawing Sheets

FIG. I
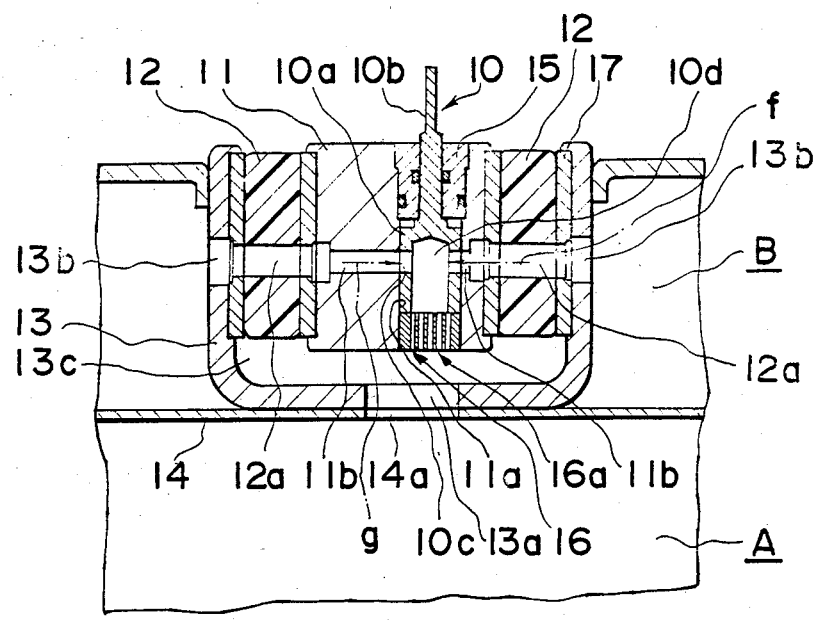
FIG. 2
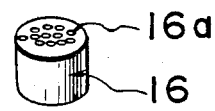

FIG. 3
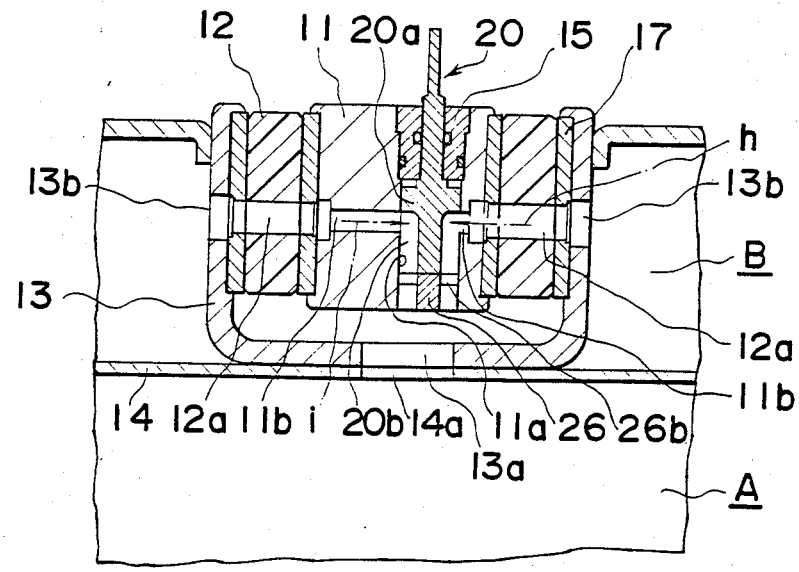
FIG. 4
FIG. 5
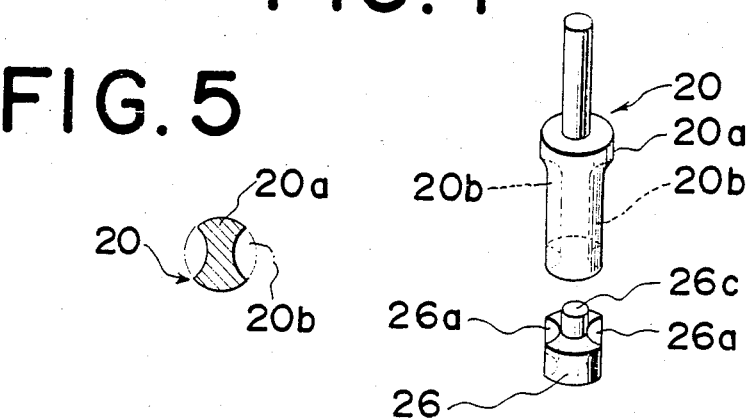

SWITCHING VALVE DEVICE IN AN AIR SUSPENSION

BACKGROUND OF THE INVENTION

This invention relates to a switching valve device in an air suspension system for automobiles provided between a plurality of air chambers sectioned with partition walls or diaphragms to freely adjust the amount of air flowing between respective air chambers.

There has been already known in such vehicles as automobiles an air suspension system wherein air chambers are provided above a shock absorber disposed between the body and axle of such a vehicle as an automobile to make or attain a spring action with high pressure air enclosed in the air chambers.

An air chamber in an air suspension system in sectioned usually into a plurality of, for example, two air chambers, and the respective air chambers are connected or disconnected with each other to vary the so-called air spring constant and to improve the riding comfort of the vehicle equipped with this air suspension system. A air suspension conventional system as is shown, for example, in hereinafter described FIGS. 6 to 8, is suggested as an air suspension system therefor.

That is to say, as shown in FIG. 6 suspension system has two air chambers A and B sectioned with a diaphragm C, housing D and partition wall E between the upper end part of a cylinder 1 and the upper end part of a piston rod 2 extending out of and into the cylinder 1 and is provided with a switching valve 4 in a path 3 connecting the two air chambers A and B with each other. The switching valve 4 is operated to be switched by an actuator 5 provided at the upper end of the piston rod 2 to connect the above mentioned air chambers A and B with each other to make or attain a so-called soft air spring constant or to throttle or disconnect the above mentioned air chambers A and B with respect to each other to make or attain a so-called hard air spring constant by utilizing only one main air chamber A.

As shown in FIGS. 7 and 8, a housing 8 is held through a rubber bush 7 within a casing 6 formed to enclose the upper end part of the piston rod 2 and the above mentioned switching valve 4 is formed of a rotary valve contained and fitted rotatably within this housing 8. The above mentioned path 3 consists of an air chamber B side path 3a and an air chamber A side path 3b. One path 3a is formed of a port 6a of the casing 6, port 7a of the rubber bush 7 and port 8a of the housing 8. The other path 3b is formed of an opening Ea of the partition wall E, opening 6b of the casing 6 and lower chamber 6c of the casing 6. The path 3a and path 3b are connected with each other through a path 4a provided in the rotary valve 4 so that, whenthe rotary valve 4 is rotated to displace the position of the path 4a, the paths 3a and 3b will be throttled or disconnected and both air chambers A and B will be disconnected with respect to each other.

Therefore, when the switching valve 4 which is the rotary valve is operated to be switched, any desired air spring constnt will be obtained and the riding comfort, for example, of a vehicle or the like will be improved.

However, when both air chambers A and B are connected with each other, if the air suspension system operates to extend, an air flow will be produced between the air chambers A and B through the above mentioned path, 3 and the air flow through the above mentioned path 3 will be in a so-called high speed state.

When particularly the air suspension system operates to extend to produce such air flows, as are indicated by the arrows a and b in FIG. 8, toward the air chamber A from the air chamber B, through both paths 8a, 8a formed as opposed to each other to secure, flow path areas and the paths 4a, 4a of the switching valve, disadvantageously the air flows from both directions will collide with each other in the path 3b within the switching valve 4. The air flows will be turbulent, and a sound will be generated by the turbulence.

Also, at the same above mentioned time, the air chamber B side will be higher in pressure than the air chamber A side, and therefore the high pressure air flowing into the path 3b within the switching valve 4 through the paths 4a,4a of the switching valve 4 will be quickly made low in pressure and in turn a so-called swish sound will be disadvantageously generated.

SUMMARY OF THE INVENTION

Therefore, a primary object of the present invention is to prevent a swish sound from being generated by the quick reduction of air pressure in the case where air passes through paths.

Another object of the present invention is to prevent a sound from being produced by the turbulence of air flows caused by the collision of air flows in a path in the case where air passes through the path.

Another object of the present invention is to provide a switching valve device in an air suspension system wherein a swish sound can be prevented from being generated.

A further object of the present invention is to provide a switching valve device in an air suspension system wherein the air pressure can be prevented from being quickly reduced and also air flows can be prevented from colliding with each other.

In order to attain the above mentioned objects, the formation of the present invention in such an air suspension system is characterized in that a rotary valve is rotatably provided in the course of a path connecting a plurality of primary air chambers with each other, such that a cushioning air chamber which may be opened and closed to one given primary air chamber is sectioned or defined between this rotary valve and a stopper holding the rotary valve, and this one primary air chamber is connected with another given primary air chamber through axial flow restruction paths provided through the stopper.

DESCRIPTION OF THE DRAWINGS

FIG. 1 is a magnified vertically sectioned view of a switching valve device in an air suspension system according to an embodiment of the present invention.

FIG. 2 is a perspective view of a stopper used in the switching valve device in FIG. 1.

FIG. 3 is a magnified vertically sectioned view of a switching valve device in an air suspension system according to another embodiment of the present invention.

FIG. 4 is a perspective view of a rotary valve and stopper used in the switching valve device in FIG. 3.

FIG. 5 is a cross-sectioned view of a rotary valve.

DESCRIPTION OF THE PREFERRED EMBODIMENTS

Figure 6:
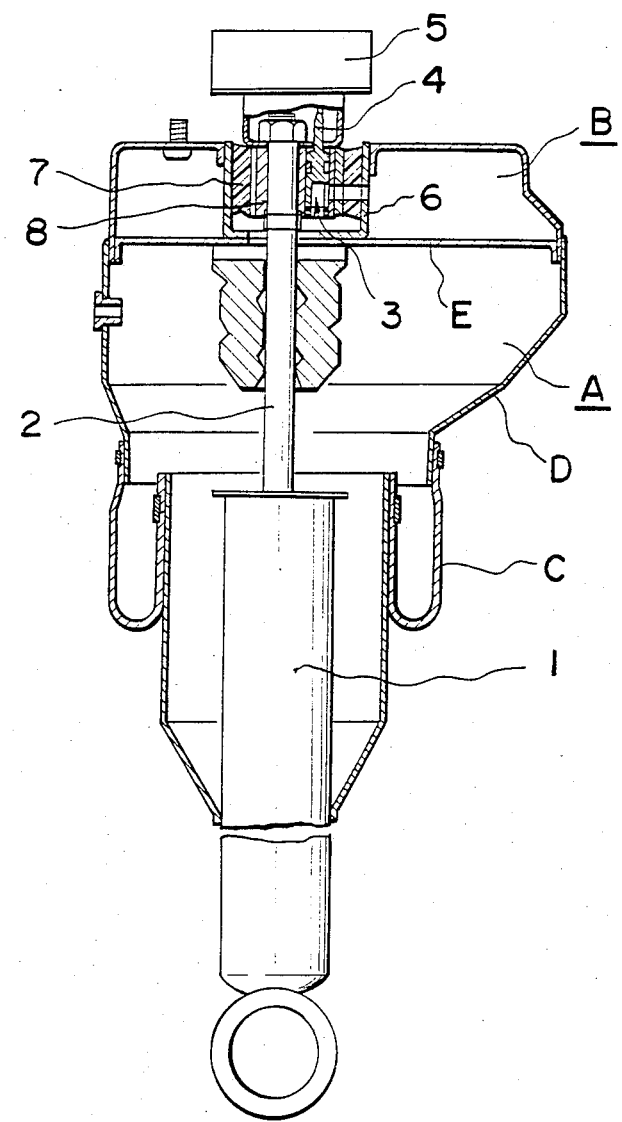
FIG. 6 is a vertically sectioned view of a conventional air suspension system.
Figure 7:
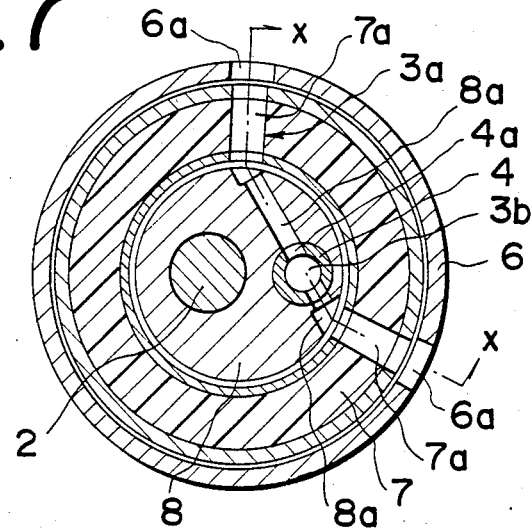
FIG. 7 is a magnified cross-sectioned view of the switching valve device in FIG. 6.
Figure 8:
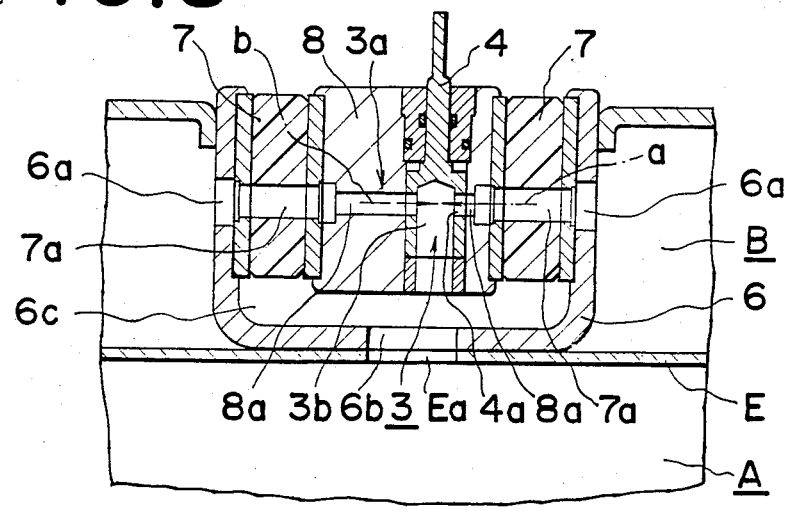
FIG. 8 is a vertically sectioned view on line X—X in FIG. 7.

Embodiments of the present invention are correspondingly explained in the following with reference to FIG. 1 to 5.

FIG. 1 and 2 show one embodiment of a switching valve device and stopper for preventing the generation of a swish sound which is primary object of the present invention.

In the switching valve device, in the same way as in the conventional primary air suspension system, for example, two air chambers A and B are connected, throttled or disconnected with respect to each other so that, when the two air chambers A and B are connected with each other with sufficient path areas, a soft air spring constant will be obtained but, on the contrary, when they are disconnected from each other, a hard air spring constant will be obtained.

A rotary valve 10 which is a switching valve is rotatably inserted within an axial through hole 11a in a housing 11 held within a rubber bush 12, in turn held within a casing 13 through a sleeve 17. More particularly, an auxiliary air chamber B is sectioned or defined outside the outer periphery of the casing 13 and a main air chamber A is sectioned or defined through a partition wall member 14 below and outside the casing 13. Openings 13a and 14a are formed respectively in the above mentioned casings 13 and partition wall member 14. A lower chamber 13c of the casing 13 and the main air chamber A are connected with each other through the openings 13a and 14a.

Ports 13b, 13b opening to the auxiliary air chamber B are formed in the above mentioned casing 13. Ports 12a, 12a communicating with the above mentioned ports 13b, 13b are formed in the above mentioned rubber bush 12. Ports 11b, 11b are formed in the above mentioned housing 11 and communicate with the above mentioned ports 12a, 12a and also with the above mentioned through hole 11a formed within the housing.

The rotary valve 10 inserted within the above mentioned through hole 11a is prevented by a cap member 15 from being pulled out in an upward axial direction and by a flow restriction stopper 16 from being dropped or displaced is a downward axial direction.

The rotary valve 10 has a cylindrically formed sliding part 10a and an upward projecting rod part 10b formed to be of a small diameter. The above mentioned sliding part 10a has an air chamber 10d formed within it and has paths 10c, 10c formed in the barrel part connect the ports 11b, 11b of the above mentioned housing 11 with the air chamber 10d.

Also, a suitable actuator is connected to the above mentioned rod part 10b so as to be operated to drive the rotary valve.

The above mentioned flow restriction stopper 16 is pressed into the lower part within the through hole 11a formed in the above mentioned housing 11, below the rotary valve 10 and in series relation therewith, thereby to contact and hold the rotary valve 10 in place in the hole 11a, and to section or define the air chamber 10d within the rotary valve above the stopper 16.

As shown also in FIG. 2, this stopper 16 is formed of a columnar body of a proper height and has many fine holes 16a which are axial flow restriction paths of small diameters formed in the axial direction through the columnar body.

As is clear from FIG. 1, the air chamber 10d forms a decompression intercommunicating buffer air chamber or cushioning air chamber, operatively between the rotary valve 10 and the flow restriction stopper 16, and which is flow connected with or disconnected from the air chamber A via operation of the rotary valve 10, and in turn in constant flow connection with the air chamber B via the flow restriction stopper 16.

Therefore, as indicated by the arrows f and g in both directions in FIG. 1, with the extending operation of the air suspension system, air will flow at once into the air chamber 10d and then into the casing 13 on the low pressure side through the fine holes 16a of the stopper 16, that is, the air will flow out to the air chamber A side. At this same time, the air within the air chamber B will be reduced in air pressure to be a little higher than on the air chamber A side in the air chamber 10d within the rotary valve 10 by the throttling action of the many fine holes 16a formed through the stopper 16, but will not be quickly reduced in air pressure so as to be of the air pressure in the air chamber A on the low pressure side and therefore a so-called swish sound which is an air passing sound will be prevented from being generated.

Another embodiment of the present invention is explained in the following with reference to FIGS. 3 to 5.

The switching valve device shown in this embodiment is to prevent a swish sound from being generated, to prevent air flows from colliding with each other to prevent such air flows from being turbulent in the path, and to prevent sound from being generated by such otherwise turbulence.

As compared with the embodiment in FIG. 1, this embodiment is modified in regard to the rotary valve and stopper but is the same in other formations as the embodiment in FIG. 1. Therefore, explanation of the corresponding detailed structure is conveniently omitted by using the same reference numerals for such structure.

That is to say, a rotary valve 20 is inserted rotatably within the through hole 11a of the housing 11 and is prevented by the cap member 15 from being pulled out in an upward axial direction and by a flow restriction stopper 26 from being dropped or displaced in a downward axial direction. As shown also in FIGS. 3 and 4, this rotary valve 20 has a plurality of rectifying grooves 20b, 20b on a large diameter part 20a rotating within the above mentioned through hole 11a. These rectifying grooves 20b, 20b are arranged to be opposed to the ports 11b, 11b of the housing 11 and are formed in the axial direction of the above mentioned rotary valve 20 to have arcuate cross-sections as shown also in FIG. 5. That is to say, with the extending operation of the air suspension system when the air from the auxiliary air chamber B is to flow out toward the main air chamber A as indicated by the arrows h and i in FIG. 3, the air flows in both directions will be independent so as not to collide with each other within the rotary valve 20. In this embodiment, as shown also in FIG. 4, rectifying grooves 26a, 26a which are axial flow restriction paths are formed also on the stopper 20 so that the air flows rectified by the rectifying grooves 20b, 20b on the above mentioned rotary valve 20 may be rectified also in the case of passing through the stopper 26.

A projection 26c rises on the upper part of the stopper 26 so as to contact the lower end of the rotary valve 20 and hold the rotary valve in place in the hole 11a, when the stopper is pressed in and the hole 11a below the rotary valve 20 and in series relation therewith in the hole 11a, to section or define an air chamber 26b corresponding to the height of the projection 26c between the rotary valve 20 and stopper 26.

This air chamber 26b communicates with the respective rectifying grooves 20b, 20b and is utilized as an air pressure cushioning chamber, in the same operative manner as described above for the air chamber 10d of the embodiment of FIG. 1. That is to say, in the same way as in FIG. 1, when air flows out of the auxiliary air chamber B under a high pressure into the main air chamber A under a low pressure, the air will be at once under an intermediate pressure so as not to be quickly reduced to the air pressure of the air chamber A but instead will prevent a swish sound, which is an air passing sound from being generated.

As is clear from the above, the present invention has the following effects:

(1) As a cushioning air chamber is sectioned or defined operatively between a rotary valve and a flow restriction stopper, when air flows out of one given high pressure primary air chamber into another given or second pressure primary air chamber, the reduction of the air pressure can be made to occur gradually and a swish sound, which is an air passing sound, will be prevented from being generated.

(2) In the case where many fine holes are formed as axial flow restriction paths through the stopper, the cushioning air chamber can be sectioned or defined in the rotary valve above the stopper, such that a swish sound silencing effect in the manner of a muffler will be developed.

(3) In the case where the rotary valve is provided with rectifying grooves communicating with the cushioning air chamber, high pressure air flows will be prevented from colliding with each other and causing turbulence and a passing sound constituting such a swish sound will be prevented from being generated by any such turbulence from a high pressure side. In turn, where the stopper is provided with rectifying grooves as axial flow restriction paths coinciding with the rectifying grooves of the rotary valve, such that the cushioning air chamber is defined operatively between the rotary valve and stopper, the sound preventing measures will be more effective.

What is claimed is:

1. Switching valve device in an air suspension system, in which high pressure air is enclosed within a plurality of primary air chambers to obtain a spring action, which comprises means defining an axial flow path having one end portion arranged for flow communication with at least one such primary air chamber and another end portion arranged for flow communication with at least another such primary air chamber, a rotary valve rotatably disposed operatively axially in the path between the end portions of the path for flow connecting and disconnecting said one end portion of the path, and in turn said at least one primary air chamber, via the rotary valve with respect to said another end portion of the path, and in turn said at least another primary air chamber, a flow restriction stopper disposed axially in the path adjacent said another end portion of the path, and positioned in contact with the rotary valve and arranged axially in series relation with the rotary valve for holding the rotary valve in place in the path, a cushioning air chamber defined operatively in the path between the rotary valve and the stopper, and axial passage means defined in the stopper for providing axial flow restriction paths therethrough for flow communicating the cushioning air chamber with said another end portion of the path, and in turn said at least another primary air chamber, and providing a flow silencing effect on air passing therethrough.

2. Device of claim 1 wherein the axial flow restriction paths in the stopper include a plurality of fine holes.

3. Device of claim 1 wherein the axial flow restriction paths in the stopper include a pair of rectifying grooves.

4. Device of claim 1 wherein the rotary valve is provided with a sliding portion for rotary sliding coaction in the adjacent interior portion of the path, and the cushioning air chamber is defined in said sliding portion in facing relation to the stopper.

5. Device of claim 1 wherein the rotary valve and stopper have adjacent end portions facing each other, and an axial projection is erected on said adjacent end portion of the stopper for contact with the adjacent end portion of the rotary valve, whereby to space the rotary valve from the stopper in the path and to define therebetween a cushioning air chamber of axial length corresponding to that of the axial projection.

6. Device of claim 1 wherein the rotary valve is provided with a pair of rectifying grooves forming separate flow paths between the cushioning air chamber and corresponding separate flow path portions of said axial flow path at said one end portion thereof for flow communication in turn with separate portions of said at least one primary air chamber.

* * * * *